(12) United States Patent
Masson et al.

(10) Patent No.: US 10,662,849 B2
(45) Date of Patent: May 26, 2020

(54) FAST HOMOGENOUS COATING PROCESS

(71) Applicant: UMICORE AG & CO. KG, Hanau-Wolfgang (DE)

(72) Inventors: Stéphane Masson, Village Neuf (FR); Celio Malentaque, Americana (BR)

(73) Assignee: Umicore AG & Co. KG, Hanau-Wolfgang (DE)

( * ) Notice: Subject to any disclaimer, the term of this patent is extended or adjusted under 35 U.S.C. 154(b) by 358 days.

(21) Appl. No.: 15/511,971

(22) PCT Filed: Sep. 11, 2015

(86) PCT No.: PCT/EP2015/070792
§ 371 (c)(1),
(2) Date: Mar. 16, 2017

(87) PCT Pub. No.: WO2016/050483
PCT Pub. Date: Apr. 7, 2016

(65) Prior Publication Data
US 2017/0239650 A1   Aug. 24, 2017

(30) Foreign Application Priority Data

Sep. 29, 2014 (WO) ................. PCT/EP2014/070813

(51) Int. Cl.
| B05D 7/22 | (2006.01) |
| F01N 3/28 | (2006.01) |
| B05C 7/04 | (2006.01) |
| F01N 3/021 | (2006.01) |

(52) U.S. Cl.
CPC .............. F01N 3/2803 (2013.01); B05C 7/04 (2013.01); B05D 7/22 (2013.01); F01N 3/021 (2013.01); F01N 2510/068 (2013.01); Y02T 10/20 (2013.01)

(58) Field of Classification Search
CPC ........... B05D 7/22; B05C 7/04; F01N 3/2803; F01N 3/021; F01N 2510/068; Y02T 10/20
USPC ....................................................... 427/230
See application file for complete search history.

(56) References Cited

U.S. PATENT DOCUMENTS

| 4,329,162 A | 5/1982 | Pitcher |
| 6,548,105 B2 | 4/2003 | Kiessling et al. |
| 8,794,178 B2 | 8/2014 | Mergner et al. |
| 9,488,087 B2 | 11/2016 | Mergner et al. |

(Continued)

FOREIGN PATENT DOCUMENTS

| CN | 102753267 A | 10/2012 |
| CN | 2037644766 U | 8/2013 |

(Continued)

OTHER PUBLICATIONS

International Search Report for PCT/EP2015/070792 dated Dec. 14, 2015 (3 pages).

(Continued)

*Primary Examiner* — Kirsten Jolley
(74) *Attorney, Agent, or Firm* — Smith, Gambrell & Russell, LLP

(57) ABSTRACT

The present invention is directed to a process for the production of exhaust catalysts. In particular, the process describes a way of coating a substrate in a manner which finally leads to reduced coating times.

13 Claims, 2 Drawing Sheets

(56) References Cited

U.S. PATENT DOCUMENTS

| | | | | |
|---|---|---|---|---|
| 2002/0022572 | A1* | 2/2002 | Taniguchi | B01J 35/04 |
| | | | | 502/339 |
| 2008/0118628 | A1 | 5/2008 | Harris et al. | |
| 2012/0321537 | A1* | 12/2012 | Mergner | B01D 53/9472 |
| | | | | 423/212 |
| 2018/0281011 | A1* | 10/2018 | Gramiccioni | B05D 7/22 |

FOREIGN PATENT DOCUMENTS

| | | |
|---|---|---|
| DE | 102010007499 A1 | 8/2011 |
| DE | 102010008700 A1 | 8/2011 |
| EP | 1136462 A1 | 9/2001 |
| EP | 1180398 A2 | 2/2002 |
| EP | 2954958 A1 | 12/2015 |

OTHER PUBLICATIONS

Written Opinion of the International Searching Authority dated Apr. 4, 2016.

Office Action for Chinese Patent Application No. 201580052602.4 dated Mar. 4, 2020 (7 pages with translation).

* cited by examiner

FAST HOMOGENOUS COATING PROCESS

The present invention is directed to a process for the production of exhaust catalysts. In particular, the process describes a way of coating a substrate in a manner which finally leads to reduced coating times.

It is well known in the field of combustion engines that fuel combustion is not complete and yields emissions of pollutants like unburned hydrocarbons (HC), carbon monoxide (CO), nitrogen oxides ($NO_x$) and particulate matter (PM). In order to improve air quality, emission limit legislations are in place to achieve lower emissions of pollutants from stationary applications and from mobile sources. For mobile sources like passenger cars, already primary measures enabled achieving decrease in the emission of pollutants. E.g., improvement of fuel-air mixing as primary measure yielded considerable diminution of pollutants. However, due to more stringent legislations having been introduced over the years the use of heterogeneous catalysts as secondary measures has been made inevitable.

An important aspect of producing these heterogeneous catalysts is the precise coating of substrates used in view of, e.g. coating length, coating quantity applied, evenness of coating layer, uniformity of coating length and coating gradients along the longitudinal axis. In order to achieve this, up to now several coating strategies have been employed that try to provide well-coated monolithic bodies, advantageously in as few time as possible.

One possibility for coating substrates is to bring the openings on one side thereof into contact with the coating medium and to draw the liquid coating medium through the openings, e.g. channels, of a substrate by applying a vacuum to the opposite side of the substrate. If the intention is to coat the channels on only part of the length thereof, it is disadvantageous that different channels are coated over different lengths due to the inevitably individual flow profile which would arise from channel to channel.

If the coating medium is forced into the channels by pressure against the force of gravity, there is then a need to check (generally by means of a sensor) when the liquid emerges at the top in case of complete or homogenous coating of the channels. However, also in this case an inhomogeneous coating within the channels of a monolith can result. If e.g. fast speed coating is established it is possible for the washcoat to penetrate the channels in a rather laminar flow with more washcoat speed in the center than in the periphery of the substrates. In this case washcoat in the middle of the substrate will emerge at the top and be detected first which results in partially coated substrates. Due to the fast speed it is as well possible to have splashes of wash-coat coming from the top of the substrate, which the sensor could detect and signals accordingly, which might lead to also only partially coated substrates.

In DE102010007499A1 a preferred coating apparatus and method is disclosed where cylindrical substrates, each having two end faces, a circumferential surface and an axial length L, further being traversed from the first end face to the second end face by a multiplicity of channels, are coated with liquid coating media. The apparatus in question has a cylinder filled with a liquid and has a piston, wherein the liquid-filled cylinder communicates with a tank, in the interior of which a displacement body is arranged in such a way that, when the piston is moved, the displacement body is moved proportionally by the liquid. The tank communicates with the coating device for the substrate, thus the displacement body acts on the liquid coating medium, with the result that a proportional change in the level of liquid coating medium in the coating device is brought about (see FIG. 1 of that application). Two sensors are arranged on the same height in the coating device in order to check whether the position of the slurry surface in the coating chamber has reached a certain level.

In a view to accelerate a coating process one crucial factor is the speed with which the coating liquid can be submitted into the substrate. This speed is defined as the velocity with which the washcoat-slurry or liquid medium front penetrates the substrate along its longitudinal axis.

In EP1180398A2 a process for coating a substrate monolith is disclosed in which in example 1 a coating speed of 3000 L/hr is mentioned. Besides the fact that in this method a classic coating approach against the force of gravity is used where the coating speed does not change over the coating length of the monolith but is stopped when the blown slurry ascended at the proximity of the top face, mentioned coating speed translates into a coating speed of 0.08 m/s for a common monolith product having a diameter of 118.4 mm and an empty surface (no walls towards the coating liquid) of around 90%.

It has been found that in a process for homogenously coating substrates for the production of exhaust gas purification catalysts, particularly for motor vehicles, which are cylindrical substrates and each have two end faces, a circumferential surface and an axial length L and are traversed from the first end face to the second end face by a multiplicity of channels, with liquid coating media, against the force of gravity, wherein the introduction of the liquid coating medium into the substrate from below is controlled in such a way that the coating speed from part of the axial length towards the end of the substrate is reduced compared to the speed at the initial introduction of the liquid coating medium into the substrate, a considerable reduction in coating time can be achieved with at the same time better coating performance compared to normal coating with a constant speed. E.g., it has been discovered that the homogeneity with regard to gradients in the coating along the longitudinal axis of the substrate can be reduced to a considerable extent.

The reduction in coating speed can be accomplished by the skilled worker. E.g., starting with a high velocity in coating the channels of the substrate from below along a certain part of its longitudinal axis, the speed of introduction of new washcoat/liquid coating medium is then diminished according to a speed reduction curve type selected from the group of linear, hyperbolic, parabolic, exponentially and logarithmic curves. In a preferred coating method, the reduction in coating speed is started not before half of the substrate is already wetted with the liquid coating medium. More preferred at least 75%, most preferred at least 80% and utmost preferred at least 90% of the longitudinal axial length of the substrate is coated with high speed before a diminution of the speed according to above defined shape is initiated.

The reduction of the coating speed is defined by the speed at which the liquid coating medium is first introduced into the substrate and the speed which prevails shortly before the liquid coating medium emerges at the top of the substrate, Le, the introduction of the coating medium comes to a stop, in a preferred embodiment, the point shortly before the liquid coating medium emerges at the top of the substrate is reached if 95%, preferably 97% and most preferably 98% of the substrate has been coated with the liquid coating medium.

In a further advantageous aspect of the present process, the coating speed at the initial introduction of the liquid coating medium into the substrate is at least twice, more preferably at least three times, more preferably at least four times the magnitude compared to the coating speed shortly before the liquid coating medium emerges at the top of the substrate, which is—for example—at 95% of the coating length of the substrate.

In another advantageous aspect of the present process, the coating speed at the initial introduction of the liquid coating medium into the substrate is at least twice, more preferably at least three times, more preferably at least four times the magnitude compared to the coating speed shortly before the liquid coating medium emerges at the top of the substrate, which is—for example—at 97% of the coating length of the substrate.

In yet another advantageous aspect of the present process, the coating speed at the initial introduction of the liquid coating medium into the substrate is at least twice, more preferably at least three times, more preferably at least four times the magnitude compared to the coating speed shortly before the liquid coating medium emerges at the top of the substrate, which is—for example—at 98% of the coating length of the substrate.

The absolute value of high coating speed at the beginning of the introduction of the liquid coating medium is dependent on the type of substrate to be coated but is above or equal to 0.1 m/s, better 0.2 m/s and even more preferred 0.3 m/s. An upper limit is only given by the equipment and substrates used but might go not beyond 0.5 m/s, preferably 0.4 m/s.

In a further preferred aspect the inventive process is designed such that the coating height of the wash-coat or liquid coating medium in the coating chamber or device is checked just before it is introduced into the substrate. This gives a precise onset from which on the coating of the substrate can be accomplished according to the present invention. The precise starting point is important in terms of meeting rather correctly the point at which the deceleration of the coating has to be initiated. The coating height can be checked by means known to the skilled worker. Normally the height of the liquid coating medium is monitored with certain sensors selected from the group consisting of electric sensors, visual sensors, capacity sensors, IR-sensors and vibrational sensors. In a more preferred manner in the present process the coating height in the coating device is checked by conductivity sensors before the liquid coating medium enters the substrate (see DE102010007499A1 FIG. 1 in this respect). In a very preferred embodiment of the present invention the coating height in the coating device is monitored by the system of sensors as mentioned in EP14171938.5. As soon as the sensors detect the liquid coating medium a signal is given to a central processing unit to define the starting point of the fast speed coating.

As already indicated the introduction of the liquid coating medium according to the present invention ends when at the top of the substrate the coating slurry or liquid coating medium emerges. This can be surveyed again by certain kind of sensors, which are known to the skilled worker. In particular, sensors of optical or ultrasonic type can be chosen preferably (http://www.baumer.com or http://www.sick.com) in this respect. They are preferably placed above the substrate, which helps to monitor the emergence of the liquid coating medium at the top of the substrate. As soon as the liquid coating medium arrives at the top of the substrate a signal is given to a central processing unit.

The device with which the present invention can preferably be performed may also comprise a central processing unit which rather automatically steers the present coating process based on the signals sent by the respective sensors (see also FIG. 1 of EP14171938.5 and disclosures made there). In a very preferred mode, the present invention is designed such that the system just explained learns by itself to optimize the coating process according to the above referenced boundary conditions. It can be considered rather useful that for different substrates (e.g. metallic or ceramic) used in different coating campaigns the system adopts itself in e.g. initial coating speed, position at which the coating speed is reduced, and the amount of reduction of coating speed to the most optimal result achievable. Hence, while submitting first substrates into a new campaign the system is programmed such that it advantageously tries to figure out the best coating conditions rather automatically. Best coating results are achieved if the differences in the coating on or in the respective substrates become minimal from substrate to substrate and/or the specification given for the coating on the substrates is meet for the highest amount of substrates possible. The self-learning software to be programmed for this exercise is based on knowledge of the skilled worker. The latter aspect is even more advantageous in view of the fact that the liquid coating medium may alter during a campaign (e.g. in viscosity) and the automated electronic system just explained can compensate for this alteration, by e.g. adapting the coating speed, and furnishes coated substrates with less deviations from the ideal coating standard envisaged.

It has already been stressed that as soon as the coating step comes to an end the coating slurry or liquid coating medium emerges at the top of the substrate. This action is monitored by sensors also (see above). As soon as the respective sensor indicates that slurry oozes out of the substrate the introduction of new liquid coating medium is stopped by the central processing unit after being signaled through the respective sensor. However, due to the enormous speeds of coating process applied it can happen that a bit of the slurry flows out of the substrate and contaminates e.g. the outer rim of the substrate. This material is lost for catalysis and thus is wasted. If PGM are present in the liquid coating medium this waste of material can become quite costly in big production campaigns. Hence, in a preferred embodiment the substrate to be coated is fixed to the coating station by inflatable seals at the circumferential surface of the substrate both at its lower end as well as at its upper end face. This helps to avoid contamination of the circumferential surface by the liquid coating medium due to its blockage by the upper seal (see FIG. 1). Surplus liquid coating medium thus remains on the top of the substrate and is simply sucked back into the substrate in the subsequent sucking step.

In another preferred aspect of the present invention the liquid coating medium comprises a viscosity between 2-200 mPa*s. Especially preferred is a process of the invention in which a device is used, which has a cylinder (102) filled with a liquid (103) and having a piston (101), wherein the liquid-filled cylinder (102) communicates with a tank (112), in the interior of which a displacement body (111) is arranged in such a way that, when the piston (101) is moved, the displacement body (111) is moved proportionally by the liquid (103), and the tank (112) communicates with the coating device (3) for the substrate (1), wherein the displacement body (111) acts on the liquid coating medium (113), with the result that a proportional change in the level of liquid coating medium (113) in the coating device (3) is brought about.

The substrates that could be taken for the present coating process are known to the skilled worker. Preferably the substrate to be coated according to the invention is a so called wall-flow filter or a flow-through monolith. The substrates used here may be made of those materials typically used for preparing catalysts, and will preferably comprise a ceramic or metallic honeycomb structure.

Suitable substrates may be employed, such as a monolithic substrate of the type having fine, parallel gas flow passages extending there through from an inlet or an outlet face of the substrate, such that passages are open to fluid flow there through (referred to as honeycomb flow-through substrates). The passages, which are essentially straight paths from their fluid inlet to their fluid outlet, are defined by walls on which or in which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 400-900 or more gas inlet openings (i.e., cells) per square inch of cross section (62-140 cells/cm$^2$).

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. The substrates useful for the catalyst composite of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium, and/or aluminum, and the total amount of these metals may advantageously comprise at least about 15 wt % of the alloy, e.g., about 10-25 wt % of chromium, about 3-8 wt % of aluminum and up to about 20 wt % of nickel. The alloys may also contain small or trace amounts of one or more other metals such as manganese, copper, vanadium, titanium and the like. The surface of the metal substrates may be oxidized at high temperatures, e.g., about 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

The substrate may also be a honeycomb wall-flow filter. Wall-flow substrates useful for supporting the coating compositions have a plurality of fine, substantially parallel gas flow passages extending along the longitudinal axis of the substrate. Typically, each passage is blocked at one end of the substrate body, with alternate passages blocked at opposite end-faces. Specific wall-flow substrates for use in the inventive apparatus include thin porous walled honeycombs (monoliths) through which the fluid stream passes without causing too great an increase in back pressure or pressure drop across the article. Normally, the presence of a clean wall-flow article will create a back pressure of 0.036 psi to 10 psi. These ceramic wall-flow substrates may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. They are preferably formed of a material having a porosity of at least 40% (e.g., from 40 to 70%) having a mean pore size of at least 5 microns (e.g., from 5 to 30 microns). More preferably, the substrates have a porosity of at least 46% and have a mean pore size of at least 10 microns. When substrates with these porosities and these mean pore sizes are coated with the apparatus described above, adequate levels of the coating compositions can be loaded onto and/or into the pores of the substrates to achieve excellent pollutant conversion efficiency and burning off soot. These substrates are still able to retain adequate exhaust flow characteristics, i.e., acceptable back pressures, despite the catalyst loading. Suitable wall-flow substrates are for example disclosed in U.S. Pat. No. 4,329,162.

The expression "coating" is to be understood to mean the application of catalytically active materials and/or storage components on a substantially inert substrate which may be constructed in the manner of an above-described wall-flow filter or flow-through monolith. The coating performs the actual catalytic function and contains storage materials and/or catalytically active metals which are usually deposited in highly disperse form on temperature-stable, large-surface-area metal oxides (see below). The coating is carried out usually by means of the application of a liquid coating medium of the storage materials and/or catalytically active components—also referred to as a wash-coat—onto and/or into the wall of the inert substrate. After the application of the liquid coating medium, the support is dried and if appropriate calcined at elevated temperatures. The coating may be composed of one layer or constructed from a plurality of layers which are applied to a substrate one above the other (in multi-layer form) and/or offset with respect to one another (in zones).

The liquid coating medium is, for example, a suspension or dispersion for coating exhaust gas catalysts for motor vehicles ("washcoat") which contains catalytically active components or precursors thereof and inorganic oxides such as aluminum oxide, titanium dioxide, zirconium oxide or a combination thereof, it being possible for the oxides to be doped with silicon or lanthanum, for example. Oxides of vanadium, chromium, manganese, iron, cobalt, copper, zinc, nickel or rare earth metals such as lanthanum, cerium, praseodymium, neodymium, promethium, samarium, europium, gadolinium, terbium, dysprosium, holmium, erbium, thulium, ytterbium or combinations thereof can be used as catalytically active components. Noble metals such as platinum, palladium, gold, rhodium, iridium, osmium, ruthenium and combinations thereof can also be used as catalytically active components. These metals can also be present as alloys with one another or with other metals or as oxides. The metals can also be present as precursors, such as nitrates, sulfites or organyls of said noble metals and mixtures thereof, and, in particular, palladium nitrate, palladium sulfite, platinum nitrate, platinum sulfite or $Pt(NH_3)_4(NO_3)_2$ can be used in the liquid coating medium. By calcination at about 400° C. to about 700° C., the catalytically active component can then be obtained from the precursor. To coat a substrate for the production of automotive exhaust gas catalysts, a suspension or dispersion of an inorganic oxide can initially be used for coating, after which, in a subsequent coating step, a suspension or dispersion which contains one or more catalytically active components can be applied. However, it is also possible for the liquid coating medium to contain both of these components. The liquid coating medium (slurry/washcoat) often has a solids content of between 35 and 52% and a viscosity of between 2 and 300 mPa*s, preferably 15-200 mPa*s.

The coating process usually starts in that a certain coating slurry is pumped via direction (114) into the coating device (3) until the sensors (4) and (4) signal that the correct coating height is reached. In the meantime a substrate (1) is placed on the coating device (3) from above and tightly fixed (as described e.g. in DE102010007499A1, DE 102010008700A1 or Chinese utility model 201420126144.7) by inflating the seals (10). These cited publications are advantageously also part of this disclosure with respect of how the coating process with the inventive apparatus can preferably be executed.

If being appropriately filled into the device (3) in the next step the coating slurry (113) is pumped further into the substrate (1) according to this invention until the desired coating is reached, i.e. the liquid coating medium emerges at the top of the substrate which is signaled by sensor (5). Subsequently, surplus coating slurry is drawn off from the substrate (1) from below, and the substrate (1) may be coated again with the same washcoat or is released from the coating chamber and processed further, e.g. coated again from the other direction or even a second time with a different washcoat from the same direction, or progressed to the weighing, drying or calcining unit.

DETAILED DESCRIPTION OF THE DRAWINGS

Figure 1:
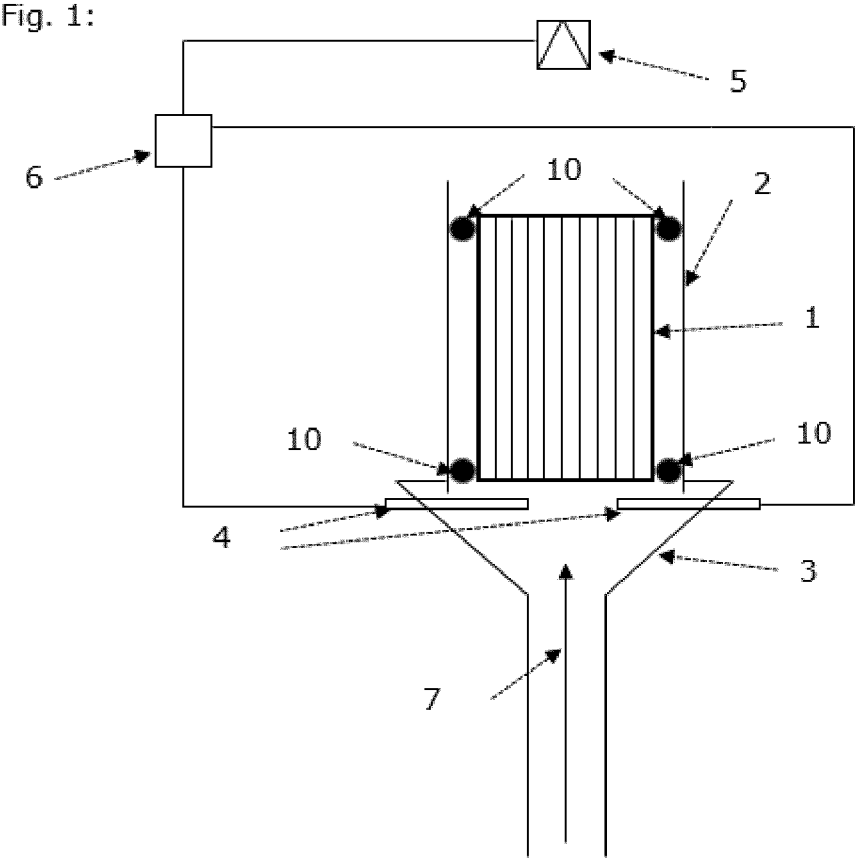
FIG. 1:
1 substrate
2 unit for fixing the substrate
3 coating device
4 sensors for monitoring the filling level in the coating device
5 sensor for monitoring the emergence of coating slurry at the top of the substrate
6 central processing unit
7 flow of liquid coating medium
10 inflatable seals

FIG. 1 shows an arrangement of the invention for coating a substrate (1). The liquid coating medium is filled through line sections (7) into the coating apparatus (3), wherein the coating apparatus (3) is provided with the substrate (1) and with sensors (4) for accurately determining the first level of the liquid coating medium in the device (3). The values determined by the sensors (4) are transmitted to a central processing unit (6) which, for its part, controls at least the further pumping or suction of the coating slurry based on the above-mentioned analysis.

After the filling of the coating apparatus (3) with coating medium up to the first level (level of sensors 4) in the filling flow direction (7) has been performed, and after the liquid coating medium emerges at the top of the substrate (1), which is monitored by sensor (5), the coating slurry can be sucked out in the return flow direction, leading to a storage tank for excess coating medium and for holding it ready for further use. All the control commands required for this purpose are preferably likewise output by the central processing unit (6).

Figure 2:
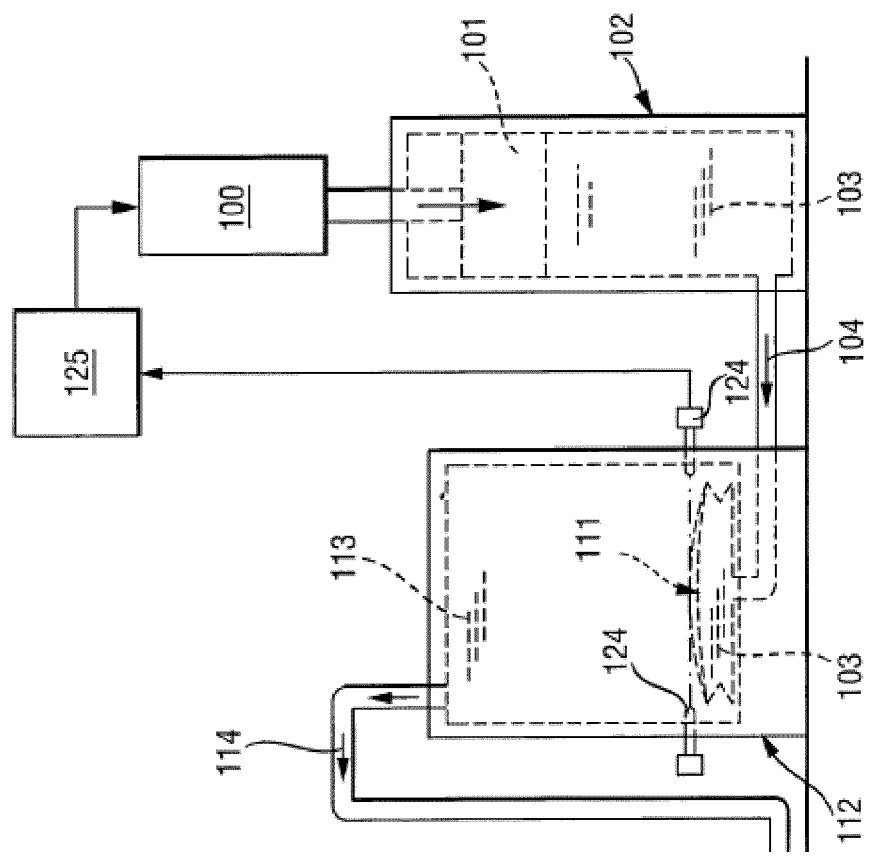
FIG. 2:
100 actuator
101 piston
102 cylinder
103 fluid
104 line section
111 displacement body
112 tank
113 liquid coating medium
114 filling flow direction
124 sensor for monitoring the displacement body
125 central processing unit

FIG. 2 shows an arrangement of the invention for coating substrates, which has a piston (101), actuated by an actuator (100), in a cylinder (102), which is filled with liquid (103) and, through a connection (104) of the cylinder (102) to the displacement body (111), allows the actuation of the displacement body (111) in the tank (112), which is filled with liquid coating medium (113) and has a line sections (114) connected to the coating unit. Sensors (124) are used to monitor the displacement volume of the coating medium (113) and the state of the displacement body (111) in the tank (112).

The values determined by the sensors (124) are also transmitted to a central processing unit (125) which, for its part, controls the actuator (100) and hence the piston (101).

All the control commands required for the purpose of coating the substrate and based on the signals stemming from (4), (5) and (124) are preferably likewise output by the central processing unit (125 [FIG. 2], 6 [FIG. 1]).

The finished substrates, which are suitable for the production of exhaust gas catalysts for motor vehicles, have a particularly uniform coating on or in its wall sections, which is at least characterized in that the homogeneity of the coating along the longitudinal channel axis is superior compared to coating with lower but therefore constant speed. It has been detected that the high speed of coating in fact serves for more homogeneity in at least the gradient in amount of catalytic species and/or amount of washcoat per unit catalyst (in g/L). The present invention achieves this result in a very easy but nevertheless surprisingly effective manner. In that a special coating speed profile is applied a very fast coating method can be employed which surprisingly still furnishes advantageously coated substrates. This greatly helps to shorten the cycle time (time needed to coat one body) but on the other hand also serves to have less coated monoliths falling out of specification. Hence, this invention allows to greatly improve the economy of a process for coating exhaust catalysts. This was not made obvious from the prior art teaching at the date of this invention.

EXAMPLES

A 2.5 l substrate with a diameter of 143.8 mm is coated according to the process described in DE102010007499A1. Compared is a normal coating process to a fast coating according to the invention. The washcoat is stopped when the overflow sensor signals the end of the introduction of coating medium.

| Setting of station test | | |
|---|---|---|
| fast speed coating | 2000 ml/s | acceleration 3000 ml/s$^2$ |
| normal speed coating | 600 ml/s | deceleration 3000 ml/s$^2$ |

| Normal coating mode | | |
|---|---|---|
| coating time (s) | stop time (deceleration) (s) | Total coating time (s) |
| 4.17 | 0.20 | 4.37 |

| New fast coating mode | | | | |
|---|---|---|---|---|
| coating time fast 80% of volume (s) | Deceleration between fast and slow (s) | coating time slow remaining volume (s) | stop time (deceleration) (s) | Total coating time (s) |
| 1 | 0.47 | 0.29 | 0.20 | 1.96 |

The conditions given are comparable to real coating processes. It can be seen that a large amount of time per piece can be saved by application of the new coating strategy. The quality of the coating with fast coating process is considerably better than with the normal coating process (600 ml/s) due to the fact that the monolith substrate used is not able to absorb water fast enough when introducing the liquid coating medium to substantially change the viscosity of the coating medium while still being introduced into the part.

The invention claimed is:

1. A process for coating a substrate with liquid coating media, against the force of gravity, for the production of an exhaust gas purification catalyst, which has an upper end face, a lower end face, an axial length L, and is traversed from the lower end face to the upper end face by a multiplicity of channels,
   wherein the introduction of the liquid coating medium into the substrate from below is controlled in such a way that the coating speed from part of the axial length towards the upper end face of the substrate is reduced compared to the speed at the initial introduction of the liquid coating medium into the lower end face of the substrate, and
   wherein the height of the liquid coating medium in the coating chamber is checked by sensing before the liquid coating medium enters the substrate, and
   the coating speed at the beginning of the introduction of the liquid coating medium is above or equal to 0.1 m/s, and
   the reduction in speed of introduction of the liquid coating medium into the lower end face of the substrate is started after at least half of the length L of the substrate is wetted with the liquid coating medium, and with the reduction in the speed of introduction occurring prior to initiation of liquid coating medium supply flow shut off into the lower end face of the substrate.

2. The process according to claim 1, wherein the coating height in the coating chamber is checked by conductivity sensors before the liquid coating medium enters the substrate.

3. The process according to claim 1, wherein the initiation of liquid coating medium supply flow shut off into the lower end face of the substrate is based on a sensing, with a sensor, of the liquid coating medium emerging at the top of the substrate.

4. The process according to claim 1, wherein a controller controls the reduction in coating speed as well as the subsequent stoppage of coating medium supply into the lower end face of the substrate.

5. The process according to claim 1, wherein a controller stops coating medium supply into the lower end face of the substrate based on a sensor positioned to monitor for coating medium supply external to the carrier upper end face.

6. The process according to claim 1, wherein there is a linear reduction in the speed of introduction of the liquid coating medium into the lower end face of the substrate.

7. The process according to claim 1 wherein a controller controls the reduction in speed of introduction of the liquid coating medium into the lower end face of the substrate based on a speed reduction profile, which speed reduction profile has, as a reference profile point, a reaching of the sensed height in the coating chamber before the liquid coating medium enters the substrate.

8. A process for coating a substrate with liquid coating media, against the force of gravity, for the production of an exhaust gas purification catalyst, which has an upper end face and a lower end face, an axial length L, and is traversed from the lower end face to the upper end face by a multiplicity of channels,
   wherein the introduction of the liquid coating medium into the substrate from below is controlled with a controller in such a way that the coating speed from a portion of the axial length prior to the upper end of the substrate is reduced compared to the speed at the initial introduction of the liquid coating medium into the lower end of the substrate, and
   wherein the liquid coating medium height in the coating chamber is checked by sensing before the liquid coating medium enters the substrate, and
   the coating speed at the beginning of the introduction of the liquid coating medium is above or equal to 0.1 m/s and follows a coating speed reduction profile determined by the controller, and
   wherein a lower end point of the coating speed reduction profile determined by the controller is reached prior to initiation of a stoppage of introduction of the coating medium supply to the substrate.

9. The process according to claim 8, wherein initiation of liquid medium flow stoppage is based on a sensing, with a sensor, of the liquid coating medium emerging out of the upper end of the substrate.

10. The process according to claim 8, wherein the controller controls the reduction in coating speed as well as the subsequent stopping of coating medium supply to the carrier.

11. The process according to claim 8, wherein the controller stops coating medium supply based on a sensor positioned to monitor for coating medium supply external to the upper end of the substrate.

12. The process according to claim 8, wherein the reduction in speed is based on a profile selected from one of a group consisting of (a) linear sloped profile, (b) a hyperbolic curved profile, (c) a parabolic curved profile, (d) an exponentially curved profile, or (e) a logarithmic curved profile.

13. The process according to claim 8, wherein the height of the liquid coating medium in the coating chamber is checked by conductivity sensors before the liquid coating medium enters the substrate.

* * * * *